United States Patent
Sato et al.

(10) Patent No.: US 6,766,207 B2
(45) Date of Patent: Jul. 20, 2004

(54) DESIGNING METHOD, CAD APPARATUS AND STORAGE MEDIUM

(75) Inventors: Yukari Sato, Kawasaki (JP); Hideki Fujino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 640 days.

(21) Appl. No.: 09/764,159

(22) Filed: Jan. 19, 2001

(65) Prior Publication Data

US 2002/0026295 A1 Feb. 28, 2002

(30) Foreign Application Priority Data

Aug. 25, 2000 (JP) ........................................ 2000-256339

(51) Int. Cl.[7] .............................................. G06F 19/00
(52) U.S. Cl. ........................................ 700/98; 700/118
(58) Field of Search ............................. 700/97, 95, 98, 700/182; 345/964

(56) References Cited

U.S. PATENT DOCUMENTS 6,136,235 A * 10/2000 Saito et al. ................ 264/40.1
6,304,794 B1 * 10/2001 Nishimine et al. .......... 700/197
6,425,194 B1 * 7/2002 Brie ............................... 36/43

FOREIGN PATENT DOCUMENTS

| JP | 10-71642 | 3/1998 |
|----|----------|--------|
| JP | 10-128817 | 5/1998 |

* cited by examiner

*Primary Examiner*—Albert W. Paladini
*Assistant Examiner*—Zoila Cabrera
(74) *Attorney, Agent, or Firm*—Staas & Halsey LLP (57) ABSTRACT

A CAD apparatus is used to design a three-dimensional model having at least one part made of a material which changes shape depending on assembling conditions. The CAD apparatus automatically obtains structural dimensions of the part in a deformed state after assembly, from structural dimensions of the part before the assembly, based on parameters including at least the assembling conditions. The CAD apparatus then creates the three-dimensional model using the structural dimensions of the part in the deformed state.

15 Claims, 11 Drawing Sheets

| SPECIFICATION | (X)n1 | (Y)n2 | (Z)n3 |
|---|---|---|---|
| A | X × 1.6 | Y × 1.6 | Z × 0.7 |
| B | X × 1.5 | Y × 1.5 | Z × 0.8 |
| C | X × 1.4 | Y × 1.4 | Z × 0.7 |
| D | X × 1.3 | Y × 1.3 | Z × 0.6 |

| SPECIFICATION | SOFT PART (ORIGINAL SHAPE) | DEFORMED SOFT PART (DEFORMED SHAPE) | h | w1 | w2 |
|---|---|---|---|---|---|
| A1 | 400 | 400A | 4 | 10 | 15 |
| B1 | 500 | 500A | 6 | 12 | 18 |
| C1 | 600 | 600A | 8 | 14 | 20 |

DESIGNING METHOD, CAD APPARATUS AND STORAGE MEDIUM

This application claims the benefit of a Japanese Patent Application No.2000-256339 filed Aug 25, 2000, in the Japanese Patent Office, the disclosure of which is hereby incorporated by reference.

BACKGROUND OF THE INVENTION

1. Field of the Invention

The present invention generally relates to designing methods, computer-aided-design (CAD) apparatuses and storage media, and more particularly to a designing method for designing a three-dimensional model having a part which changes shape before and after assembly, a CAD apparatus which employs such a designing method, and a computer-readable storage medium which stores a program for causing a computer to design a three-dimensional model by such a designing method.

2. Description of the Related Art

Conventionally, a CAD apparatus is used to design a three-dimensional model which is made up of a plurality of parts. In a case where the three-dimensional model is a printer, for example, an interference check is carried out to detect interfering locations which are generated when various parts forming the printer are automatically arranged and assembled. The interfering location refers to a portion where at least two parts overlap and interfere with each other. When such an interfering location is detected, an operator, that is, the designer, modifies the arrangement of the parts related to this interfering location based on an interfering volume, so as not to generate the interference, and then assembles the rearranged parts. Hence, the interference check is an important element of the designing of the three-dimensional model, from the point of view of improving the design quality.

The parts which are assembled include parts which are made of materials which change shape before and after the assembly. In other words, when a soft (or deformable) part is inserted between two hard parts and a thickness of this soft part before the assembly is greater than a predetermined value and a gap between the two hard parts after the assembly is set less than or equal to the predetermined value, the soft part will undergo resilient deformation.

However, the conventional CAD apparatus treats both the soft part and the hard part in the same manner. As a result, the part which actually changes shape before and after the assembly is treated with the shape before the change occurs.

For this reason, when the parts forming the three-dimensional model are automatically arranged and assembled, an interfering location which is generated on the CAD may not occur when the parts are actually assembled due to the resilient deformation of the soft part. In this first case, the interfering location generated on the CAD actually does not need to be recognized as an interfering location. On the contrary, even when no interfering location is generated on the CAD when the parts forming the three-dimensional model are automatically arranged and assembled, an interfering location may occur when the parts are actually assembled due to the resilient deformation of the soft part which causes the soft part to expand in one or more directions. In this second case, although no interfering location is generated on the CAD, it is desirable to recognize the interfering location which will actually occur.

In the first case, the interference check is carried out with respect to the interfering location which actually does not occur.

Consequently, the designer modifies the arrangement of the parts and assembles the rearranged parts although such modification and assembly are actually unnecessary or, the designer at least confirms whether or not it is necessary to modify the arrangement of the parts or the like. Therefore, there were problems in that the load on the designer becomes large, and that the designing efficiency becomes poor.

On the other hand, in the second case, the interfering location which will actually occur cannot be detected during an initial stage of the designing. For this reason, there were problems in that the load on the designer is even larger, and that the designing efficiency likewise becomes poor.

SUMMARY OF THE INVENTION

Accordingly, it is a general object of the present invention to provide a novel and useful designing method, CAD apparatus and compute-readable storage medium, in which the problems described above are eliminated.

Another and more specific object of the present invention is to provide a designing method, CAD apparatus and computer-readable storage medium which are capable of reducing the load on the designer and designing a three-dimensional model with a high designing efficiency.

Still another object of the present invention is to provide a designing method for designing a three-dimensional model having at least one part made of a material which changes shape depending on assembling conditions, comprising the steps of (a) automatically obtaining structural dimensions of the part in a deformed state after assembly, from structural dimensions of the part before the assembly, based on parameters including at least the assembling conditions, and (b) creating the three-dimensional model using the structural dimensions of the part in the deformed state. According to the designing method of the present invention, it is possible to reduce the load on the designer, and to design a three-dimensional model with a high designing efficiency.

A further object of the present invention is to provide a CAD apparatus for designing a three-dimensional model having at least one part made of a material which changes shape depending on assembling conditions, comprising a first section which automatically obtains structural dimensions of the part in a deformed state after assembly, from structural dimensions of the part before the assembly, based on parameters including at least the assembling conditions, and a second section which creates the three-dimensional model using the structural dimensions of the part in the deformed state. According to the CAD apparatus of the present invention, it is possible to reduce the load on the designer, and to design a three-dimensional model with a high designing efficiency.

Another object of the present invention is to provide a computer-readable storage medium which stores a program for causing a computer to design a three-dimensional model having at least one part made of a material which changes shape depending on assembling conditions, where the program comprises a first procedure which causes the computer to automatically obtain structural dimensions of the part in a deformed state after assembly, from structural dimensions of the part before the assembly, based on parameters including at least the assembling conditions, and a second procedure which causes the computer to create the three-dimensional model using the structural dimensions of the part in the deformed state. According to the computer-readable storage medium of the present invention, it is possible to reduce the load on the designer, and to design a three-dimensional model with a high designing efficiency.

Other objects and further features of the present invention will be apparent from the following detailed description when read in conjunction with the accompanying drawings.

DESCRIPTION OF THE PREFERRED EMBODIMENTS

A description will be given of various embodiments of a designing method, a CAD apparatus, and a computer-readable storage medium according to the present invention, by referring to the drawings.

Figure 1:
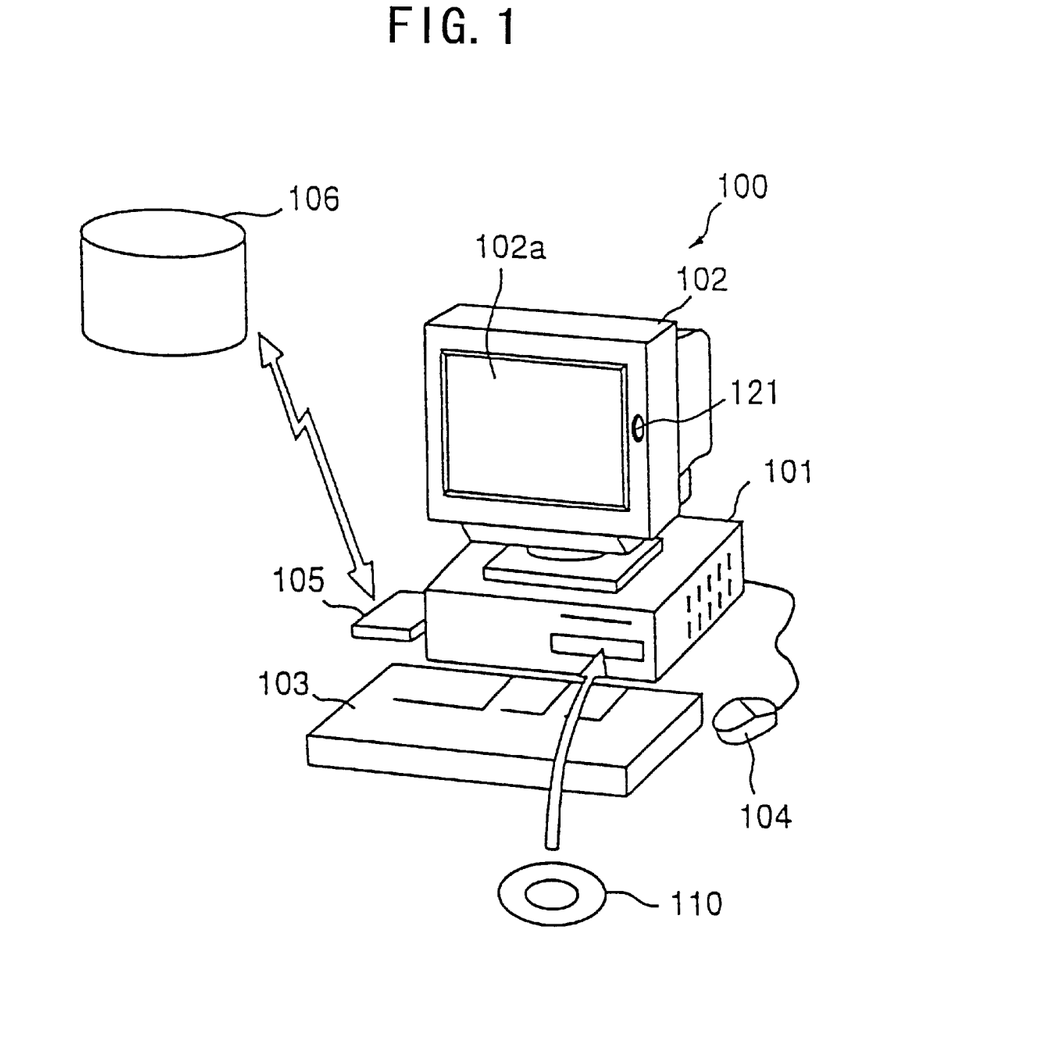
FIG. 1 is a perspective view showing a computer system applied with the present invention in a first embodiment of the present invention.

First, a description will be given of a first embodiment of the CAD apparatus according to the present invention. This first embodiment of the CAD apparatus employs a first embodiment of the designing method according to the present invention and a first embodiment of the computer-readable storage medium according to the present invention. In this first embodiment, the present invention is applied to a computer system. FIG. 1 is a perspective view showing the computer system applied with the present invention in this first embodiment.

A computer system 100 shown in FIG. 1 is generally provided with a main body 101 which includes a CPU, a disk drive and the like, a display 102 which includes a display screen 102a for displaying an image in response to an instruction from the main body 101, a keyboard 103 which is used to input various information to the computer system 100, a mouse 104 which is used to specify an arbitrary position on the display screen 102a of the display 102, a modem 105 which is used to access an external database or the like and to download programs or the like stored in another computer system, and one or more speakers 121 for reproducing sound.

A three-dimensional model designing program (or a three-dimensional model designing software) which causes the computer system 100 to have a three-dimensional model designing function is stored in a portable recording medium such as a disk 110 or, is downloaded from a recording medium 106 of another computer system using a communication unit such as the modem 105. The computer-readable storage medium according to the present invention is formed by a recording medium, such as the disk 110, which stores the three-dimensional model designing program. The recording medium forming the computer-readable storage medium according to the present invention is not limited to portable recording media such as the disk 110, IC card memory, floppy disk, magneto-optical disk and CD-ROM, but also includes various kinds of recording media which are accessible by a computer system which is coupled via the communication unit or communication means such as the modem 105 and LAN.

Figure 2:
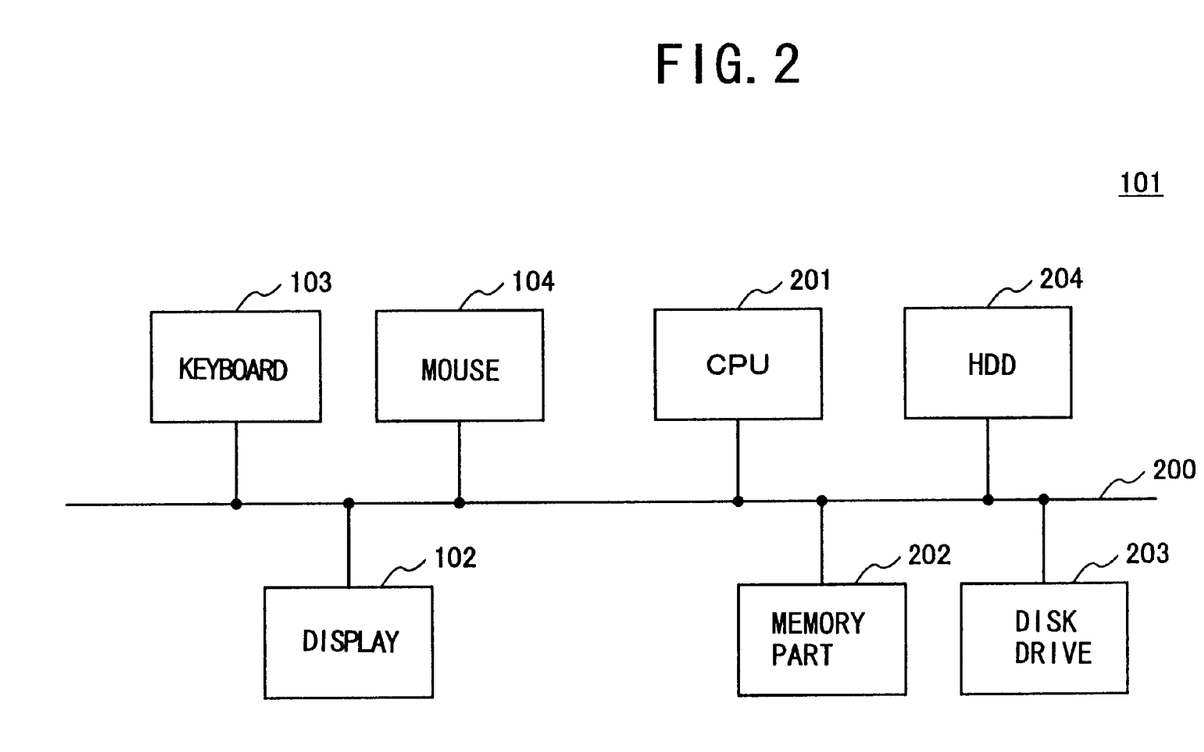
FIG. 2 is a system block diagram for explaining the construction of an important part within a main body of the computer system.

FIG. 2 is a system block diagram for explaining the structure of an important part within the main body 101 of the computer system 100. In FIG. 2, the main body 101 generally includes a CPU 201, a memory part 202 made of RAM, ROM or the like, a disk drive 203 for the disk 110, and a hard disk drive (HDD) 204 which are connected via a bus 200. The display 102, the keyboard 103, the mouse 104 and the like may be connected to the CPU 201 via the bus 200 as shown in FIG. 2 or, connected directly to the CPU 201. It is also possible to connect the display 102 to the CPU 201 via a known graphic interface (not shown) which carries out an input/output image data processing.

Of course, the structure of the computer system 100 is not limited to that shown in FIGS. 1 and 2, and various other known structures may be used instead.

Figure 3:
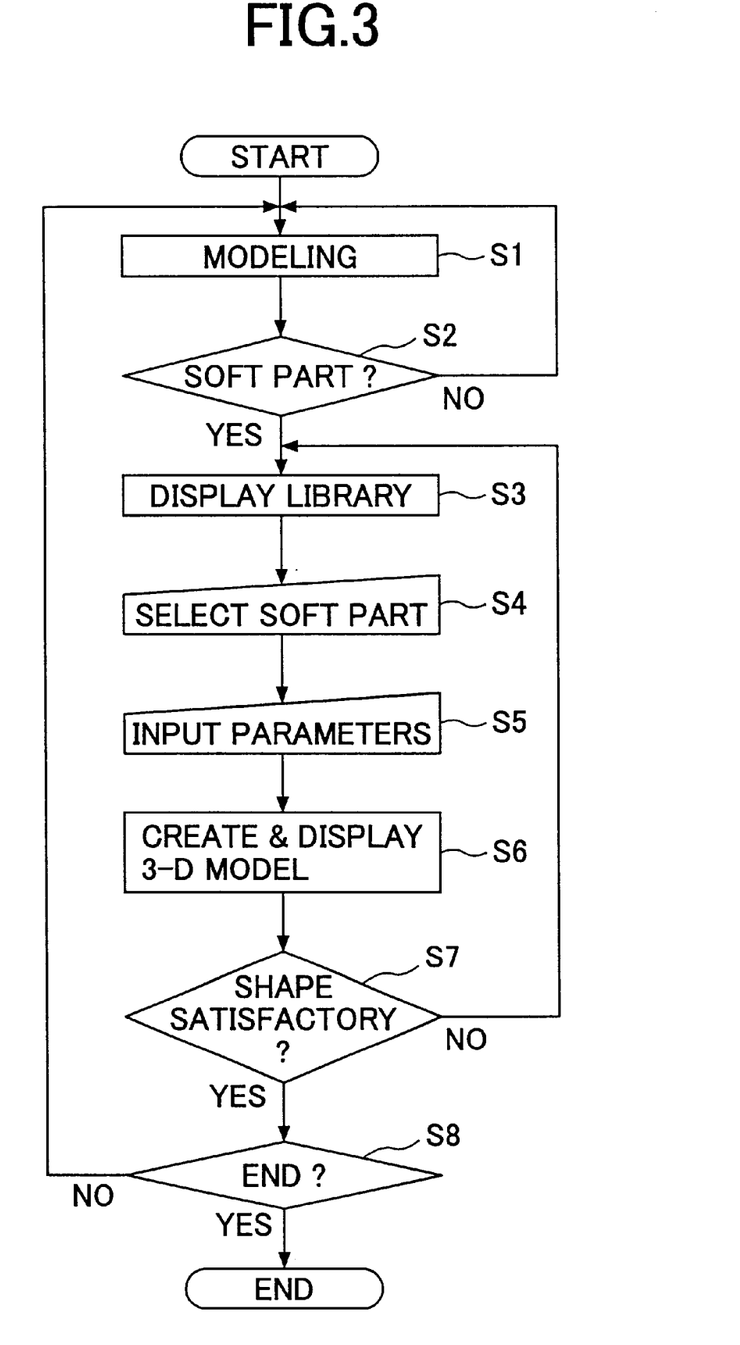
FIG. 3 is a flow chart for explaining the operation of the first embodiment.

FIG. 3 is a flow chart for explaining the operation of this first embodiment. The process shown in FIG. 3 is carried out by the CPU 201 shown in FIG. 2.

In FIG. 3, a step S1 starts a modeling process, and selects parts forming a three-dimensional model which is to be designed. A step S2 decides whether or not each selected part is a soft part or a deformable part (hereinafter simply referred to as a soft part) which is made of a material which changes shape depending on assembling conditions. The process returns to the step S1 if the decision result in the step S2 is NO. On the other hand, if the decision result in the step S2 is YES, a step S3 reads information related to each selected soft part and parameters thereof from a library which is stored in a storage means such as the HDD 204, and displays the read information on the display 102. In a case where the selected soft part is a coil spring, for example, the information which is displayed on the display 102 includes coil springs having various dimensions and characteristics, and parameters these coil springs. A step S4 selects a particular soft part which is to be used for the three-dimensional model from the information displayed on the display 102, using the mouse 104, for example.

A step S5 uses the keyboard 103, for example, to input parameters of each selected soft part. The parameters which are input include at least the assembling conditions, and may also include the material or the like of each selected soft part. The assembling conditions include dimensions of a space in which the soft part is accommodated after the assembly, temperature conditions under which the soft part is used after the assembly, humidity conditions under which the soft part is used after the assembly, and the like. The storage means such as the HDD 204 prestores, in the form of a table, calculation formulas for calculating the structural dimensions of each soft part in the deformed state depending on the parameters. Hence, the shape of each soft part in the deformed state after the assembly can be obtained automatically from this table.

A step S6 carries out a process of creating the three-dimensional model by assembling each of the parts, including each soft part in the deformed state after the assembly, and displays the created three-dimensional model on the display 102. A step S7 carries out an interference check with respect to the displayed three-dimensional model, and decides whether or not the shape of the three-dimensional model is satisfactory. In this case, the interference check is carried out with respect to each soft part in the deformed state after the assembly, and only one or more interferences which are actually generated after the parts are assembled are detected by this interference check. In other words, the modification of the arrangement of the parts and the assembling of the rearranged parts which are originally unnecessary but carried out in the conventional CAD apparatus, are not be carried out in this embodiment. For this reason, this embodiment can greatly reduce the load on the designer compared to the conventional CAD apparatus. If one or more interfering locations are detected or the shape of the three-dimensional model is unsatisfactory, the decision result in the step S7 becomes NO, and the process returns to the step S3. On the other hand, if the decision result in the step S7 is YES, a step S8 decides whether or not the modeling process is to end. The process returns to the step S1 if the decision result in the step S8 is NO, and the process ends if the decision result in the step S8 is YES.

Figure 4:
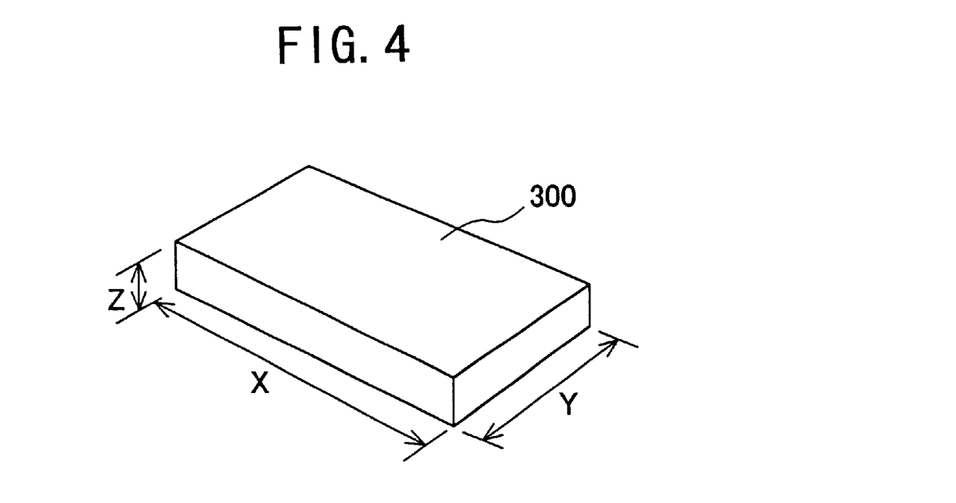
FIG. 4 is a perspective view showing a soft part.

FIG. 4 is a perspective view showing a soft part. In FIG. 4, a soft part 300 is made of a rubber sheet which is used to absorb vibration, for example. The structural dimensions of this soft part 300 are such that a length in a x-axis direction is X, a length in a y-axis direction is Y, and a length in a z-axis direction is Z.

Figure 5:
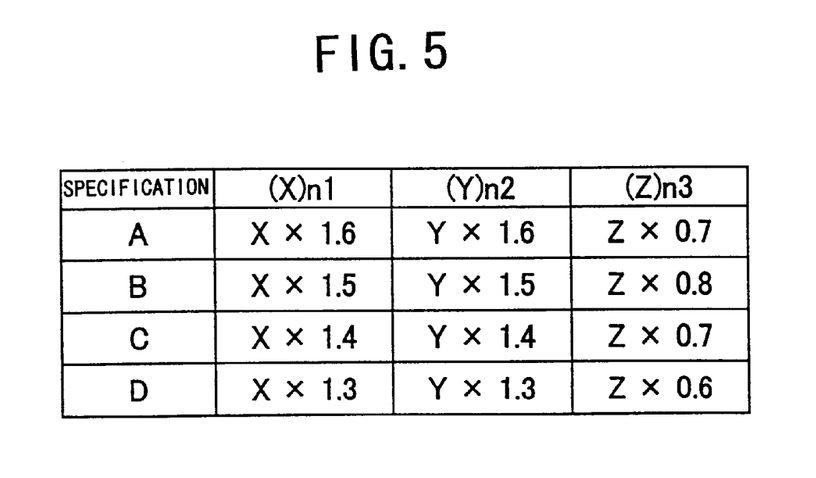
FIG. 5 is a diagram for explaining a table of calculation formulas.

FIG. 5 is a diagram for explaining the table of calculation formulas. The table shown in FIG. 5 stores the calculation formulas for obtaining the lengths X, Y and Z of the soft part 300 in the deformed state, with respect to each of specifications A through D which are dependent on at least the assembling conditions.

Figure 6:
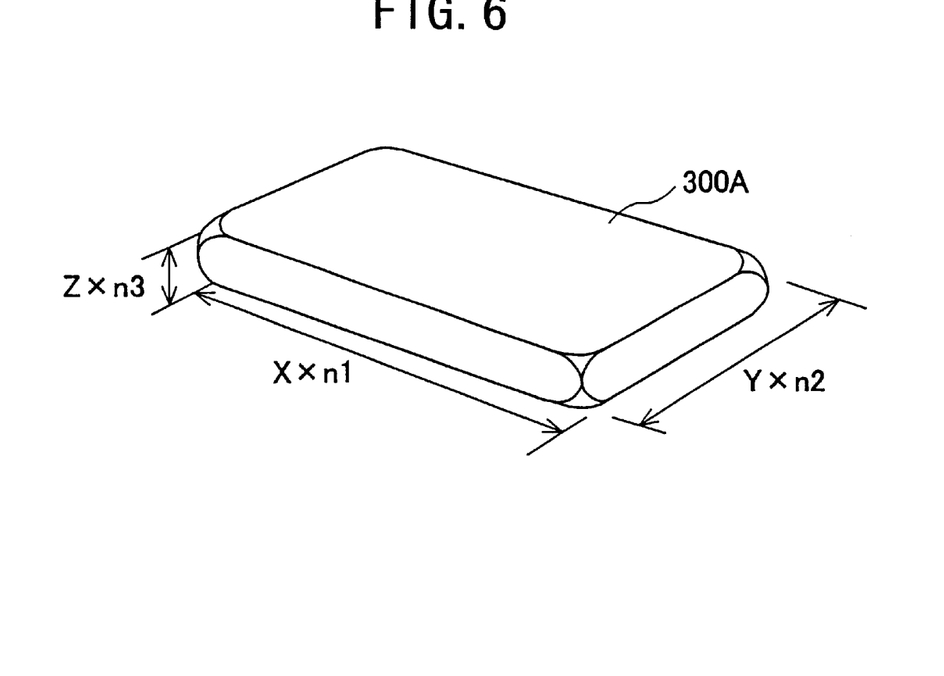
FIG. 6 is a perspective view showing the soft part in a deformed state.

FIG. 6 is a perspective view showing the soft part in the deformed state. A deformed soft part 300A shown in FIG. 6 corresponds to the soft part 300 in the deformed state. The structural dimensions of the deformed soft part 300A are such that a length in the x-axis direction is X·n1, a length in the y-axis direction is Y·n2, and a length in the z-axis direction is Z·n3.

In the table shown in FIG. 5, the formulas for obtaining the structural dimensions of the deformed soft part 300A with respect to the specification A, for example, are X·n1=X·1.6 for the length in the x-axis direction, Y·n2=Y·1.6 for the length in the y-axis direction, Z·n3=Z·0.7 for the length in the z-axis direction. In this case, the values of n1, n2 and n3 differ among the specifications A through D because the amount of deformation of the deformed soft part 300A differs depending on the assembling conditions and the material used for the soft part 300.

Figure 7:
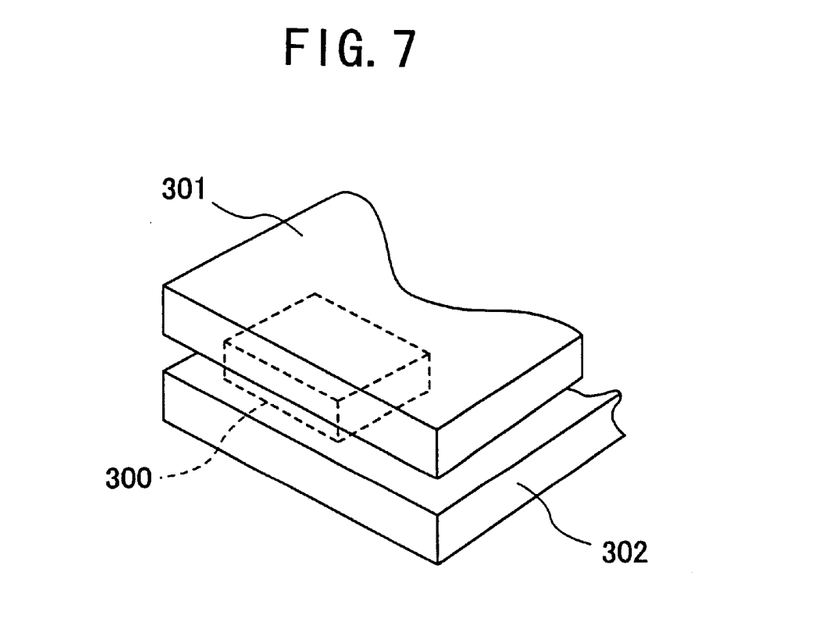
FIG. 7 is a perspective view for explaining a case where the soft part is provided between hard parts.
Figure 8:
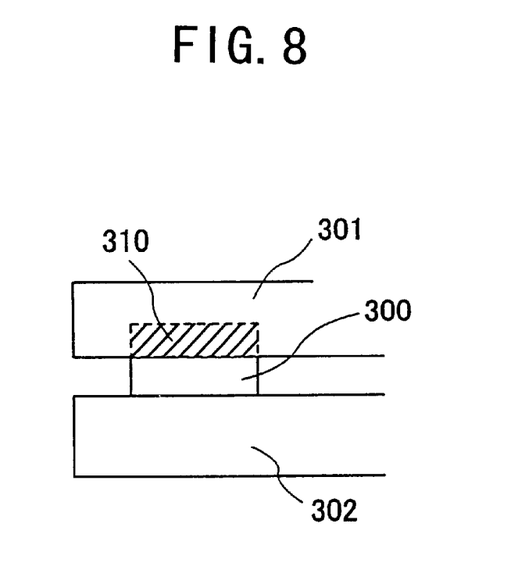
FIG. 8 is a side view for explaining an interference check when creating a three-dimensional model using the soft part before assembly.
Figure 9:
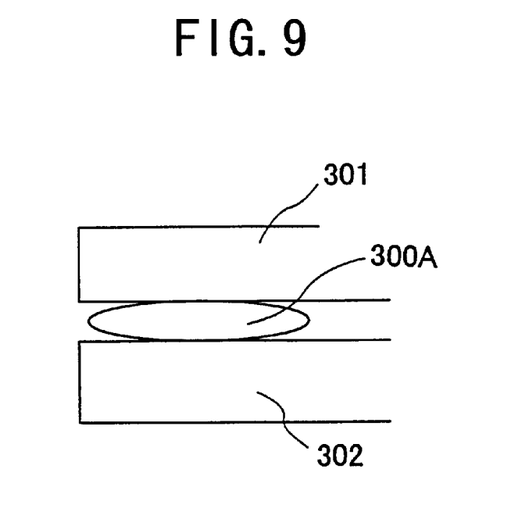
FIG. 9 is a side view for explaining the interference check when creating the three-dimensional model using the soft part after assembly.

FIGS. 7 through 9 are diagrams for explaining the interference check.

FIG. 7 is a perspective view for explaining a case where the soft part 300 is provided between hard parts 301 and 302. In this case, it is assumed for the sake of convenience that a distance between the hard parts 301 and 302 in the z-axis direction after the assembly is smaller than the length Z of the soft part 300 in the z-axis direction before the assembly.

FIG. 8 is a side view for explaining the interference check for a case where the soft part 300 before the assembly is used to create the three-dimensional model after the assembly, as is done in the conventional designing method. In this case, the soft part 300 before the assembly is not in the deformed state, and thus, an interfering location 310 is detected as indicated by the hatching in FIG. 8. However, the deformed soft part 300A after the assembly actually does not generate an interfering location. For this reason, the conventional designing method modifies the arrangement of the parts to eliminate the interfering location 310 which actually does not occur and the assembles the rearranged parts, although such processes are originally unnecessary, to thereby increase the load on the designer.

It is conceivable to obtain in advance the deformed soft part after the assembly, with respect to each of the soft parts before the assembly. But according to this conceivable method, one deformed soft part must be prepared with respect to each soft part before the assembly. In addition, even with respect to soft parts having identical shapes and dimensions, it is necessary to prepare one deformed soft part with respect to each of the materials used for the soft parts having the identical shapes and dimensions. Therefore, when the three-dimensional model is formed by a large number of parts, as is generally the case, this conceivable method is impractical in that an extremely large number of parts must be managed and stored in the CAD apparatus.

FIG. 9 is a side view for explaining the interference check when creating the three-dimensional model after the assembly, using the deformed soft part 300A after the assembly. In this embodiment, the table described above is used to automatically obtain the structural dimensions of the deformed soft part 300A after the assembly from the structural dimensions of the soft part 300 before the assembly. In this case, the assembling conditions which are input in the step S5 include the distance in the z-axis direction between the hard parts 301 and 302 after the assembly. Accordingly, the deformed soft part 300A has the shape and structural dimensions of the soft part 300 for the case where the parts 300, 301 and 302 are actually assembled, to thereby enable an accurate interference check to be carried out.

Of course, contrary to the above described case, the deformed soft part 300A after the assembly may interfere with one or more parts after the assembly. In this case, the interfering location is accurately detected by the interference check, based on the shape and structural dimensions of the deformed soft part 300A after the assembly.

In addition, in a case where the assembling conditions are too severe, it is possible to output an alarm message or the like on the display 102 or via the speaker 121, for example, to notify the designer that the soft part 300 cannot satisfy the assembling conditions. For example, the assembling conditions may be too severe when the distance in the z-axis direction between the hard parts 301 and 302 after the assembly is smaller than a minimum value of the length Z of the deformed soft part 300A in the z-axis direction.

FIGS. 10A, 10B, 11A and 11B are diagrams for explaining the interference check.

Figure 10A:
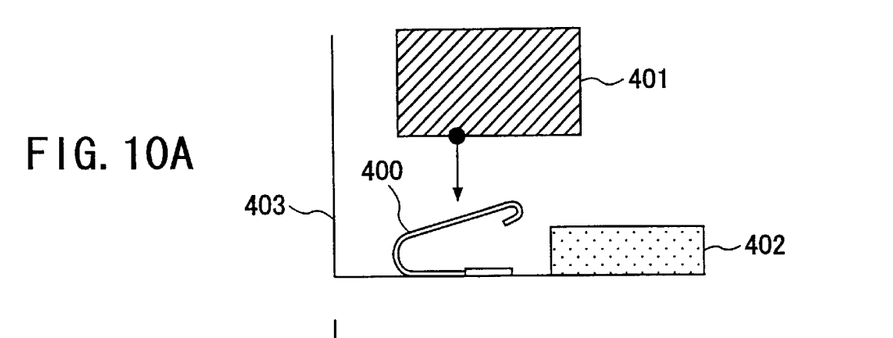
FIGS. 10A and 10B respectively are side views for explaining another case where a soft part is provided between hard parts.
Figure 10B:
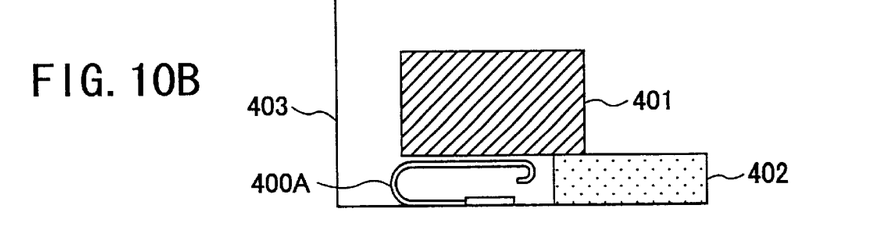

FIGS. 10A and 10B respectively are side views for explaining a case where a soft part 400 is provided between hard parts 401 and 402, on a hard part 403. FIG. 10A shows a state before the assembly, and FIG. 10B shows a state after the assembly. The soft part 400 is made of a spring member. In this case, it is assumed that a distance in the z-axis direction between the hard parts 401 and 402 after the assembly is smaller than the length Z in the z-axis direction of the soft part 400 before the assembly.

Figure 11A:
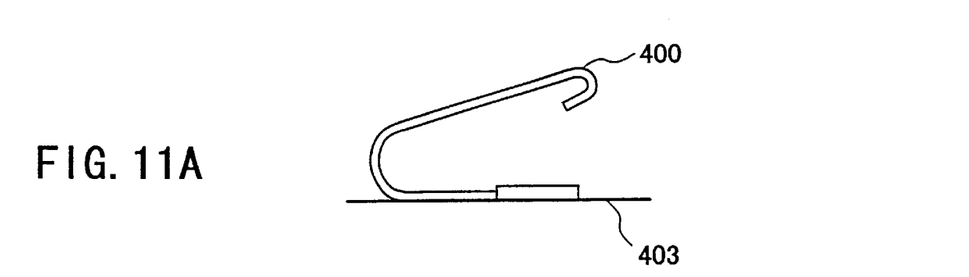
FIGS. 11A and 11B respectively are side views for explaining an interference check when creating the three-dimensional model using the soft part after assembly.
Figure 11B:
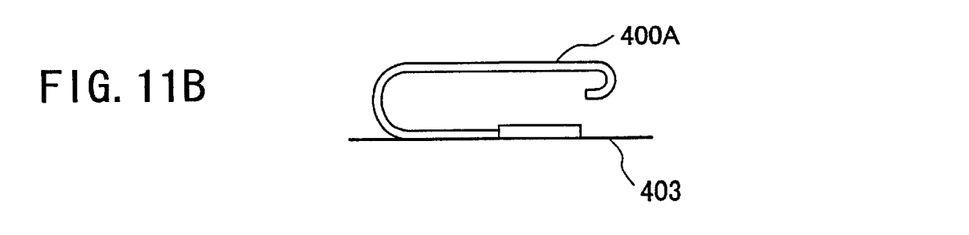

FIGS. 11A and 11B respectively are side views for explaining an interference check when creating the three-dimensional model after the assembly using a deformed soft part 400A after the assembly. FIG. 11A shows a state of the soft part 400 before the assembly, and FIG. 11B shows a state of the deformed soft part 400A after the assembly. In this embodiment, the table described above is used to automatically obtain the structural dimensions of the deformed soft part 400A after the assembly from the structural dimensions of the soft part 400 before the assembly. In this case, the assembling conditions which are input in the step S5 include the distance in the z-axis direction between the hard parts 401 and 402 after the assembly. Accordingly, the deformed soft part 400A has the shape and structural dimensions of the soft part 400 for the case where the parts 400, 401, 402 and 403 are actually assembled, to thereby enable an accurate interference check to be carried out.

In addition, in a case where the assembling conditions are too severe, it is possible to output an alarm message or the like on the display 102 or via the speaker 121, for example, to notify the designer that the soft part 400 cannot satisfy the assembling conditions. For example, the assembling conditions may be too severe when the distance in the z-axis direction between the hard parts 401 and 402 after the assembly is smaller than a minimum value of the length Z of the deformed soft part 400A in the z-axis direction.

Figure 12:
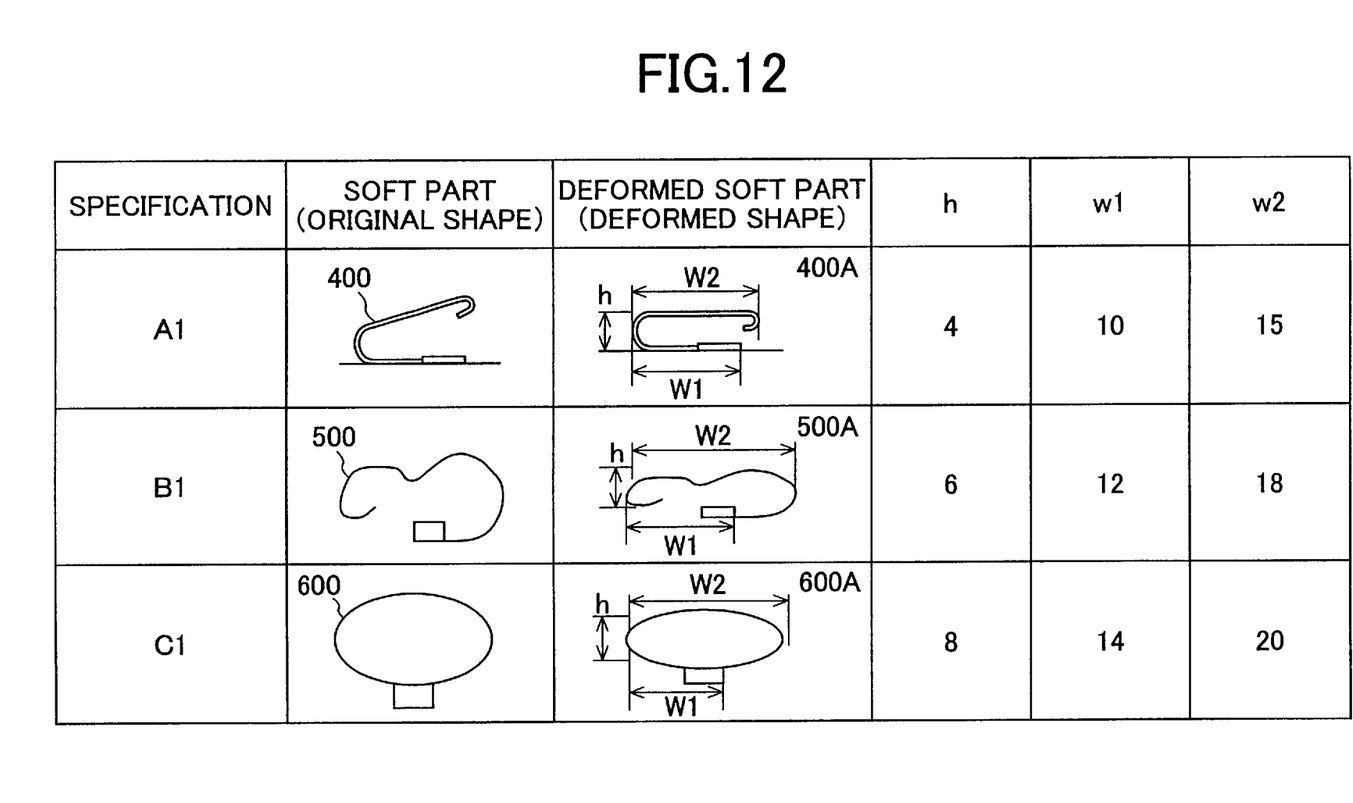
FIG. 12 is a diagram for explaining a library.

FIG. 12 is a diagram for explaining the library of the soft parts and the parameters thereof used in the step S3 described above. This library is stored in the storage means such as the HDD 204. For the sake of convenience, the library shown in FIG. 12 stores the soft part 400 with respect to the specification A1, a soft part 500 with respect to the specification B1, a soft part 600 with respect to the specification C1, and parameters of these soft parts 400, 500 and 600. The parameters include the deformed soft parts 400A, 500A and 600A with respect to the soft parts 400, 500 and 600, and dimensions h, w1 and w2 of the deformed soft parts 400A, 500A and 600A.

The soft parts are not limited to the rubber sheets and spring members described above, and include any kind of deformable parts including sponge or spongy members. Furthermore, the parts made of the materials which change shape depending on the assembling conditions are not limited to the soft part, and include any kind of parts made of materials which change shape due to thermal expansion or the like depending on the assembling conditions such as the temperature conditions and the humidity conditions.

Figure 13:
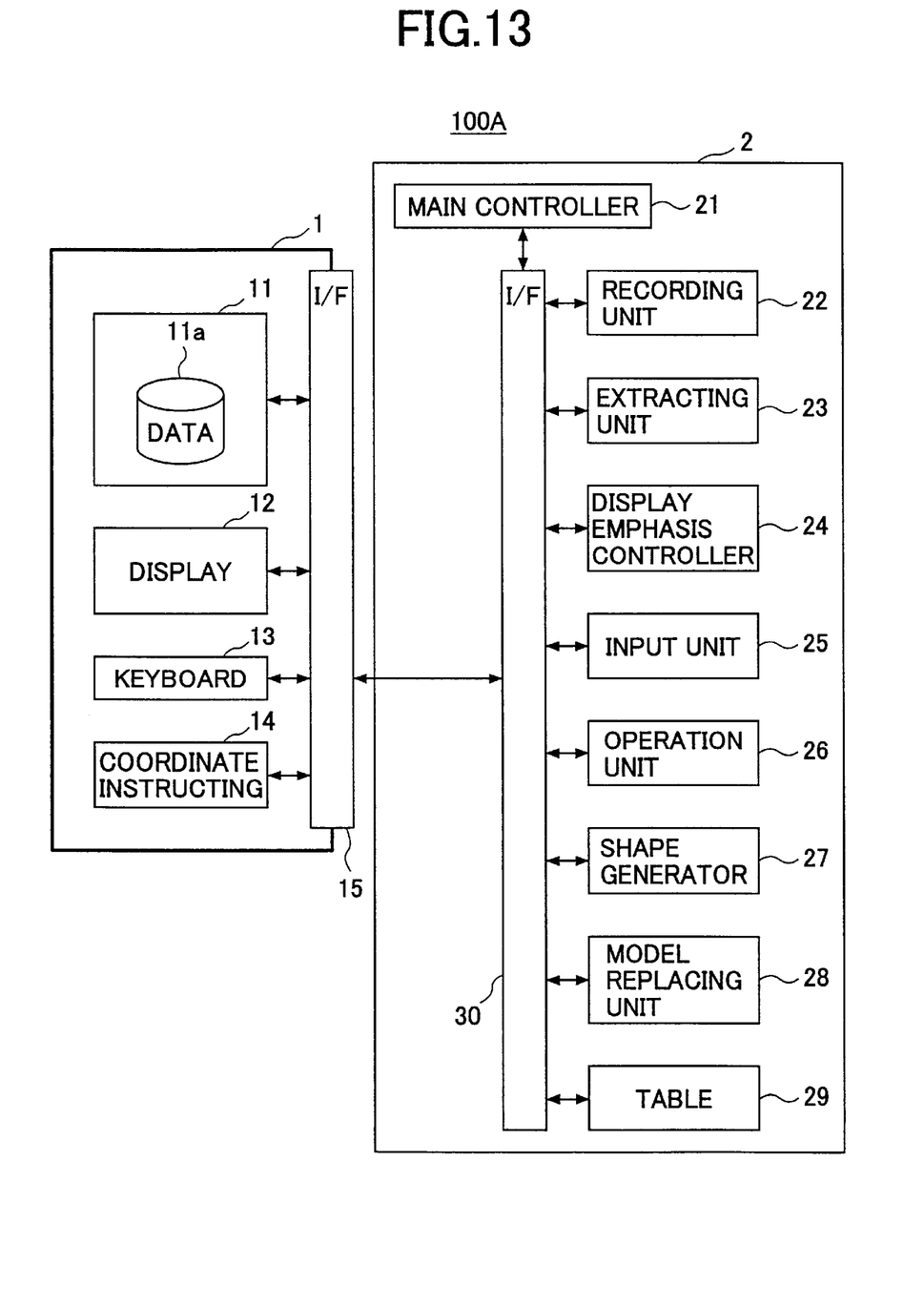
FIG. 13 is a functional block diagram showing a computer system applied with the present invention in a second embodiment of the present invention.

Next, a description will be given of a second embodiment of the CAD apparatus according to the present invention. This second embodiment of the CAD apparatus employs a second embodiment of the designing method according to the present invention and a second embodiment of the computer-readable storage medium according to the present invention. In this second embodiment, the present invention is applied to a computer system. FIG. 13 is a functional block diagram showing the computer system applied with the present invention in this second embodiment. A computer system 100A having the functional structure shown in FIG. 13 may basically be realized by the computer system 100 described above in conjunction with FIGS. 1 and 2.

The computer system 100A shown in FIG. 13 generally includes an input and output section 1 and a control section 2. The input and output section 1 includes a storage unit 11, a display unit 12, a keyboard unit 13, a coordinate instruction unit 14, and an interface (I/F) 15 which are connected as shown in FIG. 13. The storage unit 11 includes a storage part 11a for storing data which are necessary to create a three-dimensional model. The storage unit 11 corresponds to the memory part 202, the disk drive 203 and the HDD 204 shown in FIG. 2. The display unit 12 corresponds to the display 102 shown in FIGS. 1 and 2. The keyboard unit 13 and the coordinate instruction unit 14 respectively correspond to the keyboard 103 and the mouse 104 shown in FIGS. 1 and 2.

On the other hand, the control section 2 includes a main controller 21, an applicable part information recording unit 22, an applicable part extracting unit 23, a display emphasis controller 24, a numerical value input unit 25, an operation unit 26, a shape generator 27, a model replacing unit 28, an editing definition table 29 and an interface (I/F) 30 which are connected as shown in FIG. 13. The main controller 21 controls the operations of each of the units 22 through 29. The units 21 through 29 correspond to the CPU 201 shown in FIG. 2. The input and output section 1 and the control section 2 are connected via the respective interfaces 15 and 30. These interfaces 15 and 30 correspond to the bus 200 shown in FIG. 2.

Figure 14:
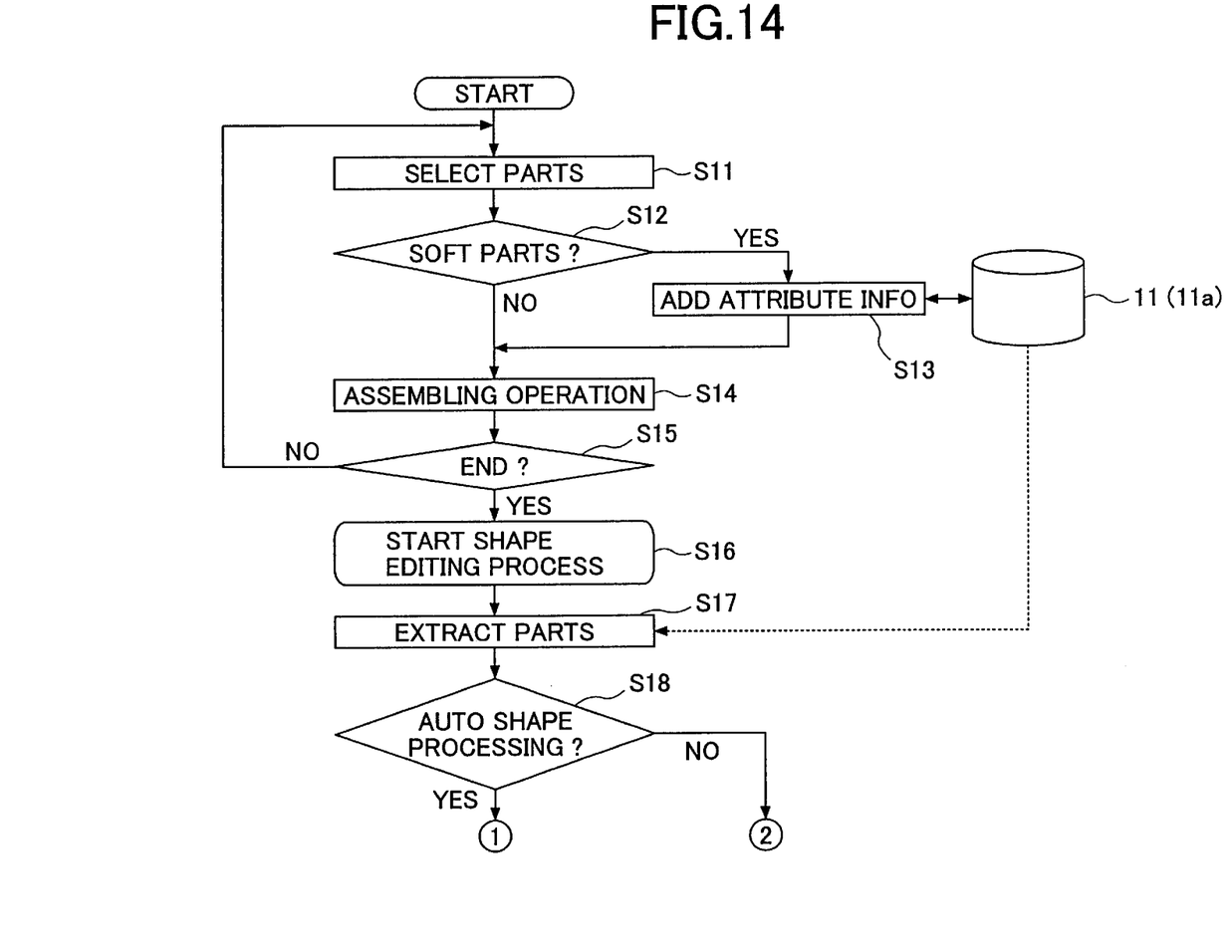
FIG. 14 is a flow chart for explaining the operation of the second embodiment.
Figure 15:
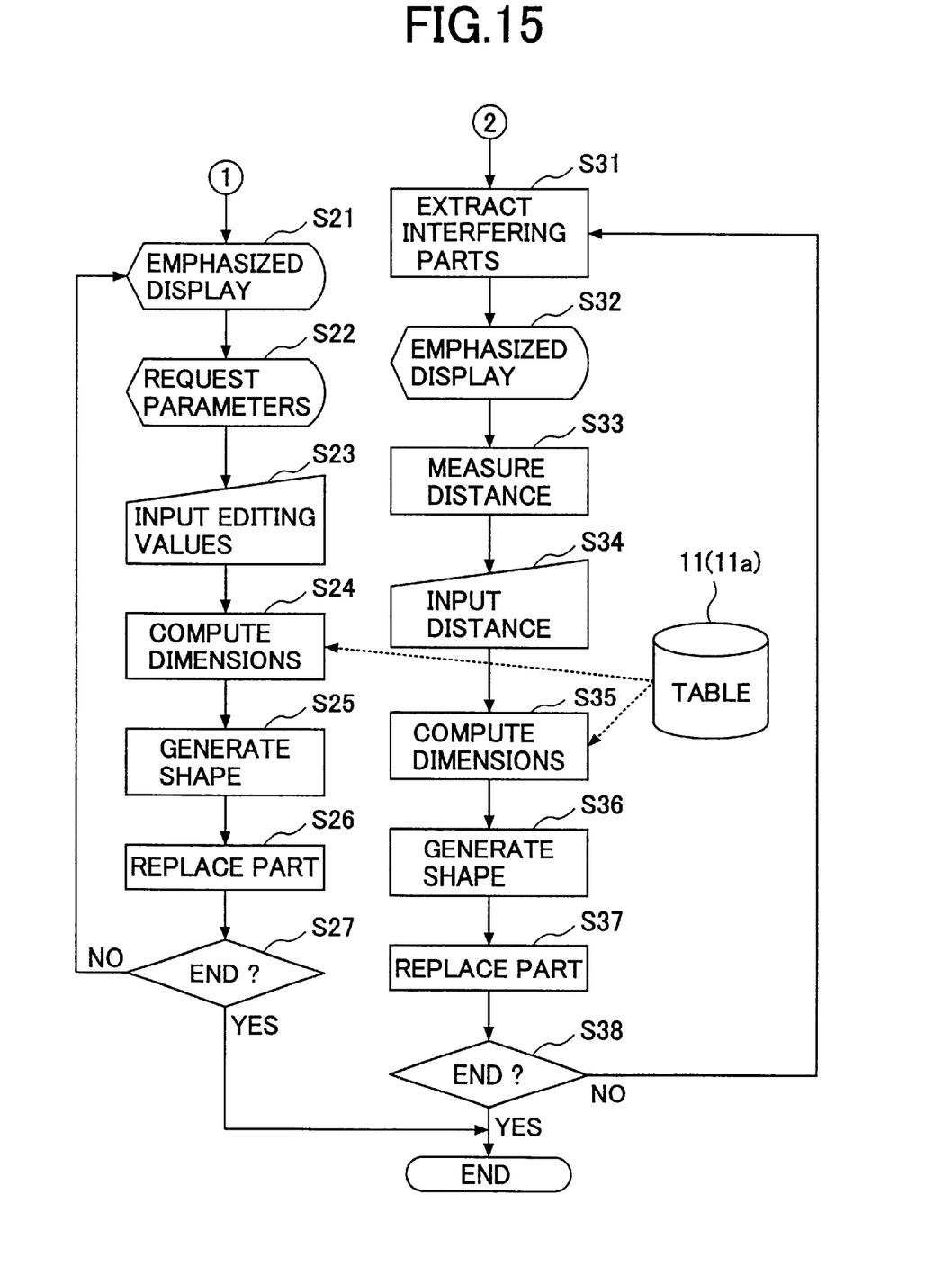
FIG. 15 is a flow chart for explaining the operation of the second embodiment.

FIGS. 14 and 15 are flow charts for explaining the operation of this second embodiment.

In FIG. 14, when a modeling process (or an assembling process) is started, a step S11 selects parts forming a three-dimensional model which is to be designed. A step S12 decides whether the selected parts are soft parts or deformable parts (hereinafter simply referred to as applicable parts) made of materials which change shape depending on the assembling conditions. The process advances to a step S14 which will be described later, if the decision result in the step S12 is NO. On the other hand, if the decision result in the step S12 is YES, a step S13 reads the selected applicable parts and parameters thereof from a library which is stored in the storage unit 11, and displays the read information on the display unit 12. The step S13 also adds to the applicable parts attribute information based on inputs made from the keyboard unit 13 and/or the coordinate instructing unit 14. The attribute information includes information related to a marking which indicates a part which is to be subjected to a shape editing, an editing interval at the time of the assembly, grouping, and the like. The information related to the applicable parts, including the added attribute information, is recorded in the storage unit 11 by the applicable part information recording unit 22. For example, the information related to the applicable parts, which is recorded in the storage unit 11, include a part number, a part name, a category code and the like with respect to each of the applicable parts. After the step S13, the process advances to the step S14.

The step S14 carries out an assembling operation to assemble the parts including the applicable parts and to create the three-dimensional model, based on the inputs from the keyboard unit 13 and/or the coordinate instruction unit 14. A step S15 decides whether or not the assembling operation ended, and the process returns to the step S11 if the decision result in the step S15 is NO. On the other hand, if the decision result in the step S15 is YES, a step S16 starts a shape editing process. A step S17 extracts the applicable parts from the assembled three-dimensional model by the applicable part extracting unit 23, based on the information stored in the storage unit 11. A step S18 decides whether or not a setting is made to carry out an automatic shape processing which processes the shape automatically. The automatic shape processing may be set in advance or, set by an input from the keyboard unit 13 or the coordinate instructing unit 14. The process advances to a step S21 shown in FIG. 15, if the decision result in the step S18 is YES. On the other hand, the process advances to a step S31 shown in FIG. 15 if the decision result in the step S18 is NO.

In FIG. 15, the step S21 makes an emphasized display of the same kind of applicable parts by the display emphasis controller 24, so that the same kind of applicable parts are displayed on the display unit 12 in an emphasized state. The emphasized display is not limited to a specific type, and any type of emphasized display may be employed as long as the same kind of applicable parts can easily be visually distinguished from other parts including other kinds of applicable parts. A step S22 requests the parameters of the applicable parts. A step S23 inputs the parameters by the numerical value input unit 25, that is, inputs the editing values of the applicable parts input from the keyboard unit 13, for example. The parameters which are input includes at least the assembling conditions, and may also include the materials and the like of the applicable parts. The assembling conditions include dimensions of a space in which each applicable part is accommodated after the assembly, temperature conditions under which each applicable part is used after the assembly, humidity conditions under which each applicable part is used after the assembly, and the like.

The storage unit 11 prestores, in the form of a table, the calculation formulas for the structural dimensions of each of the applicable parts in the deformed state depending on the parameters. The shape of each applicable part in the deformed state after the assembly can be obtained automatically based on this table. This table is read from the storage unit 11 and is transferred to the editing definition table 29. A step S24 automatically computes the structural dimensions of each applicable part in the deformed state after the assembly by the operation unit 26 using the editing definition table 29, based on the assembling conditions of the input parameters. In addition, a step S25 automatically generates the shape of each applicable part in the deformed state after the assembly by the shape generator 27, based on the computed result of the structural dimensions. A step S26 replaces each applicable part before the assembly and within the three-dimensional model which is assembled in the step S14, by the corresponding generated applicable part in the deformed state after the assembly, by the model replacing unit 28, and creates the three-dimensional model with the applicable parts in the deformed state after the assembly, by carrying out an assembling operation to assemble the parts. The step S26 also displays on the display unit 12 the created three-dimensional model with the applicable parts in the deformed state after the assembly. A step S27 decides whether or not the assembling operation to assemble the three-dimensional model using the applicable parts in the deformed state is ended, and the process returns to the step S21 if the decision result in the step S27 is NO. The process ends if the decision result in the step S27 is YES.

On the other hand, the step S31 carries out an interference check, and detects an interfering location if one or more parts of the three-dimensional model interfere with any of the applicable parts. When the step S31 is carried out for the first time, the three-dimensional model does not include the applicable parts in the deformed state after the assembly, and thus, no interfering location is detected the first time. A step S32 makes an emphasized display of each applicable part and each related part which interferes with the applicable part, by the display emphasis controller 24. As a result, each applicable part and each related part which interferes with the applicable part are displayed on the display unit 12 in an emphasized state. The emphasized display is not limited to a specific type, and any type of emphasized display may be employed as long as the applicable parts and the related parts in the interfering relationship can easily be visually distinguished from other parts which are not in the interfering relationship. When assembling the parts 300 through 302 shown in FIG. 7, for example, a step S33 manually measures the distance or gap between the confronting parts 301 and 302 on the display unit 12. When the measured distance or gap is input from the keyboard unit 13, for example, a step S34 inputs the measured distance or gap by the numerical value input unit 25.

A step S35 automatically computes the structural dimensions of each applicable part in the deformed state after the assembly by the operation unit 26, based on the input distance or gap, using the editing definition table 29 described above. In addition, based on the computed structural dimensions, a step S36 automatically generates the shape of each applicable part in the deformed state after the assembly by the shape generator 27. A step S37 replaces each applicable part before the assembly and within the three-dimensional model which is assembled in the step S14, by the corresponding generated applicable part in the deformed state after the assembly, by the model replacing unit 28, and creates the three-dimensional model with the applicable parts in the deformed state after the assembly, by carrying out an assembling operation to assemble the parts. The step S37 also displays on the display unit 12 the created three-dimensional model with the applicable parts in the deformed state after the assembly. A step S38 decides whether or not the assembling operation to assemble the three-dimensional model using the applicable parts in the deformed state is ended, and the process returns to the step S31 if the decision result in the step S38 is NO. The process ends if the decision result in the step S38 is YES.

When carrying out the automatic shape processing of the steps S21 through 27, it is also possible to carry out the interference check, similarly as when carrying out the manual shape processing of the steps S31 through S38.

In this embodiment, the interference check is carried out with respect to each soft part in the deformed state after the assembly, and only one or more interferences which are actually generated after the parts are assembled are detected by this interference check. In other words, the modification of the arrangement of the parts and the assembling of the rearranged parts which are originally unnecessary but carried out in the conventional CAD apparatus, are not be carried out in this embodiment. For this reason, this embodiment can also greatly reduce the load on the designer compared to the conventional CAD apparatus.

Further, the present invention is not limited to these embodiments, but various variations and modifications may be made without departing from the scope of the present invention.

What is claimed is:

1. A designing method to design a three-dimensional model having at least one first part made of a material that changes shape depending on assembling conditions, comprising:

automatically obtaining structural dimensions of the at least one first part in a deformed state after assembly, from the structural dimensions of the at least one first part before the assembly and based on parameters comprising at least the assembling conditions; and creating the three-dimensional model, which is assembled from at least one second part made of a hard material that does not change shape depending on the assembly conditions and the at least one first part, using the structural dimensions of the at least one first part in the deformed state.

2. The designing method as claimed in claim 1, wherein said obtaining of said structural dimensions of the at least one first part automatically obtains the shape of the at least one first part in the deformed state using a table prestoring calculation formulas of the structural dimensions of the at least one first part in the deformed state, depending on the parameters.

3. The designing method as claimed in claim 1, wherein the parameters comprise the assembling conditions and the material of the at least one first part.

4. The designing method as claimed in claim 1, wherein the assembling conditions are at least one of dimensions of a space of the at least one first part in the deformed state after the assembly, temperature conditions of the at least one first part in the deformed state after the assembly, and humidity conditions of the at least one first part in the deformed state after the assembly.

5. The designing method as claimed in claim 1, further comprising:

carrying out an interference check, with respect to the three-dimensional model created by said creating of the three-dimensional model, said interference check detecting interfering locations generated when the first and second parts are assembled to form the three-dimensional model.

6. A computer-aided-design (CAD) apparatus to design a three-dimensional model having at least one first part made of a material that changes shape depending on assembling conditions, comprising:

a first section configured to automatically obtain structural dimensions of the at least one first part in a deformed state after assembly, from the structural dimensions of the at least one first part before the assembly, and based on parameters including at least the assembling conditions; and a second section configured to create the three-dimensional model, which is assembled from at least one second part made of a hard material that does not change shape depending on the assembly conditions and the at least one first part, using the structural dimensions of the at least one first part in the deformed state.

7. The CAD apparatus as claimed in claim 6, further comprising:

a table prestoring calculation formulas of the structural dimensions of the at least one first part in the deformed state depending on the parameters, said first section automatically obtaining the shape of the at least one first part in the deformed state using said table.

8. The CAD apparatus as claimed in claim 6, wherein the parameters comprise the assembling conditions and the material of the at least one first part.

9. The CAD apparatus as claimed in claim 6, wherein the assembling conditions are at least one of dimensions of a space of the at least one first part in the deformed state after the assembly, temperature conditions of the at least one first part in the deformed state after the assembly, and humidity conditions of the at least one first part in the deformed state after the assembly.

10. The CAD apparatus as claimed in claim 6, further comprising:

a third section configured to carry out an interference check, with respect to the three-dimensional model created by said second section, said interference check detecting interfering locations generated when the first and second parts are assembled to form the three-dimensional model.

11. A computer-readable storage medium storing a program to cause a computer to design a three-dimensional model having at least one first part made of a material that changes shape depending on assembling conditions, said program comprising:

a first procedure causing the computer to automatically obtain structural dimensions of the at least one first part in a deformed state after assembly, from the structural dimensions of the at least one first part before the assembly and based on parameters including at least the assembling conditions; and a second procedure causing the computer to create the three-dimensional model, which is assembled from at least one second part made of a hard material that does not change shape depending on the assembly conditions and the at least one first part, using the structural dimensions of the at least one first part in the deformed state.

12. The computer-readable storage medium as claimed in claim 11, wherein said first procedure causes the computer to automatically obtain the shape of the at least one first part in the deformed state using a table prestoring calculation formulas of the structural dimensions of the at least one first part in the deformed state, depending on the parameters.

13. The computer-readable storage medium as claimed in claim 11, wherein the parameters comprise the assembling conditions and the material of the at least one first part.

14. The computer-readable storage medium as claimed in claim 11, wherein the assembling conditions are at least one of dimensions of a space of the at least one first part in the deformed state after the assembly, temperature conditions of the at least one first part in the deformed state after the assembly, and humidity conditions of the at least one first part in the deformed state after the assembly.

15. The computer-readable storage medium as claimed in claim 11, further comprising:

a third procedure causing the computer to carry out an interference check, with respect to the three-dimensional model created by said second procedure, said interference check detecting interfering locations generated when the first and second parts are assembled to form the three-dimensional model.

* * * * *

UNITED STATES PATENT AND TRADEMARK OFFICE
CERTIFICATE OF CORRECTION

PATENT NO. : 6,766,207 B2
DATED : July 20, 2004
INVENTOR(S) : Yukari Sato et al.

It is certified that error appears in the above-identified patent and that said Letters Patent is hereby corrected as shown below:

Column 11,
Line 41, delete ",".

Signed and Sealed this

Thirtieth Day of November, 2004

JON W. DUDAS
*Director of the United States Patent and Trademark Office*